(12) United States Patent
Duerksen

(10) Patent No.: US 6,243,177 B1
(45) Date of Patent: Jun. 5, 2001

(54) BIDIRECTIONAL WDM OPTICAL COMMUNICATION SYSTEM WITH BIDIRECTIONAL ADD-DROP MULTIPLEXING

(75) Inventor: Gary Duerksen, College Park, MD (US)

(73) Assignee: Seneca Networks, Inc., Rockville, MD (US)

( * ) Notice: Subject to any disclaimer, the term of this patent is extended or adjusted under 35 U.S.C. 154(b) by 0 days.

(21) Appl. No.: 09/677,764

(22) Filed: Oct. 3, 2000

(51) Int. Cl.[7] .......................... H04J 14/02; H04B 10/12; H04B 10/16; G02B 6/26; G02B 6/42

(52) U.S. Cl. .......................... 359/127; 359/130; 359/124; 359/173; 359/179; 385/31; 385/42

(58) Field of Search .................. 359/124, 127, 359/130, 138, 173, 179; 385/31, 37, 42

(56) References Cited

U.S. PATENT DOCUMENTS

| | | | |
|---|---|---|---|
| 5,479,082 | * 12/1995 | Calvani et al. | 359/127 |
| 5,604,627 | 2/1997 | Kohn | 359/341 |
| 5,608,825 | 3/1997 | Ip | 385/24 |
| 5,633,741 | 5/1997 | Giles | 359/124 |
| 5,712,932 | 1/1998 | Alexander et al. | 385/24 |
| 5,726,785 | 3/1998 | Chawki et al. | 359/130 |
| 5,742,416 | 4/1998 | Mizrahi | 359/134 |
| 5,748,349 | 5/1998 | Mizrahi | 359/130 |
| 5,748,350 | 5/1998 | Pan et al. | 359/130 |
| 5,751,456 | 5/1998 | Koonen | 359/127 |
| 5,778,118 | 7/1998 | Sridhar | 385/24 |
| 5,812,306 | 9/1998 | Mizrahi | 359/341 |
| 5,822,095 | 10/1998 | Taga et al. | 359/127 |
| 5,841,918 | 11/1998 | Li | 385/24 |
| 5,887,091 | 3/1999 | Jabr et al. | 385/24 |
| 5,909,295 | 6/1999 | Li et al. | 359/130 |
| 5,926,300 | 7/1999 | Miyakawa et al. | 359/124 |
| 5,946,430 | 8/1999 | Morrow et al. | 385/24 |
| 5,995,259 | 11/1999 | Meli et al. | 359/134 |
| 6,020,986 | 2/2000 | Ball | 359/130 |
| 6,038,045 | 3/2000 | Sotom et al. | 359/128 |
| 6,040,932 | 3/2000 | Duck et al. | 359/124 |
| 6,041,152 | 3/2000 | Clark | 385/24 |

(List continued on next page.)

OTHER PUBLICATIONS

Ramaswami et al., *Optical Networks: A Practical Perspective*, (Morgan Kaufmann, © 1998) pp. 83–130.

Primary Examiner—Jason Chan
Assistant Examiner—M. R. Sedighian
(74) Attorney, Agent, or Firm—Margaret A. Burke

(57) ABSTRACT

The present invention provides bidirectional add-drop multiplexers for bidirectional wavelength division multiplexed optical communication systems. In a first configuration, the bidirectional add-drop multiplexer includes six three-port optical circulators. The bidirectional add-drop multiplexer is placed at any point along a bidirectional transmission waveguide configured to carry two counter-propagating wavelength division multiplexed optical signals. The bidirectional waveguide places the west-east wavelength division multiplexed optical signal into the first port of the first circulator where it is routed to the first port of the second optical circulator. A channel selector is positioned between the second and third optical circulators for add/dropping optical channels. The through channels and any added channels exit through the first port of the fourth circulator as a counter-propagating east-west WDM optical signal enters the first port. The counter-propagating WDM signal encounters the fifth and sixth optical circulators along with a second channel selector for similar add-drop multiplexing. The east-west WDM optical signal and any added channels then exit onto the bidirectional transmission waveguide through the first port of the first circulator as the west-east WDM optical signal enters the same circulator port. Optional amplification and dispersion compensation may also be provided in the bidirectional add-drop multiplexer.

6 Claims, 4 Drawing Sheets

U.S. PATENT DOCUMENTS

| | | | |
|---|---|---|---|
| 6,061,484 * | 5/2000 | Jones et al. | 385/24 |
| 6,067,389 | 5/2000 | Fatehi et al. | 385/17 |
| 6,069,719 | 5/2000 | Mizrahi | 359/124 |
| 6,081,368 | 6/2000 | Delavaux | 359/341 |
| 6,101,016 | 8/2000 | Roberts et al. | 359/177 |
| 6,108,468 | 8/2000 | Kaneko et al. | 385/24 |
| 6,122,095 | 9/2000 | Fatehi | 359/337 |
| 6,122,096 | 9/2000 | Fatehi | 359/341 |
| 6,130,765 * | 10/2000 | Gautheron | 359/127 |

* cited by examiner

BIDIRECTIONAL WDM OPTICAL COMMUNICATION SYSTEM WITH BIDIRECTIONAL ADD-DROP MULTIPLEXING

BACKGROUND OF THE INVENTION

1. Field of the Invention

The invention is directed to optical communication systems in general and, more particularly, to bidirectional optical communication systems that transport wavelength division multiplexed optical signals in opposite directions over the same bidirectional waveguiding medium and which can selectively add or drop one or more arbitrary optical channels at any point along the bidirectional waveguide.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufman, © 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent, occurring at widely-spaced add-drop nodes.

Many designs have been proposed for add-drop multiplexing in unidirectional wavelength division multiplexed optical communication systems. In U.S. Pat. No. 6,061,484, a prior-art single channel unidirectional add-drop multiplexer is depicted. The basic configuration consists of two three-port optical circulators with an in-fiber Bragg grating disposed in a fiber connecting the circulators. A unidirectional WDM signal enters the first circulator; a channel to be dropped is reflected by the grating to a drop port while the remaining channels of the WDM signal pass through to the second circulator. Similarly, a channel to be added enters the second circulator, is output to the same grating and reflected back towards the second circulator. In this way, a channel pair having the same channel wavelength is add-dropped from the unidirectional WDM optical signal.

Various improvements to this class of unidirectional add-drop multiplexers have been proposed. Some of these improvements include tunable grating filters, switchable gratings, multiple channel dropping and/or adding, etc. Such add-drop multiplexers for unidirectional wavelength division multiplexed optical communication systems are described in U.S. Pat. Nos. 5,479,082, 5,608,825, 5,712,932, 5,726,785, 5,748,349, 5,751,456, 5,778,118, 5,822,095, 5,841,918, 5,926,300, 5,946,430, 6,020,986, 6,038,045, 6,040,932, 6,061,484, 6,067,389, 6,069,719, 6,108,468, 6,122,095, and 6,122,096, the disclosures of which are incorporated by reference herein.

Although the designs for such add-drop multiplexers are suitable for conventional unidirectional (typically long-haul interexchange carrier markets) WDM optical systems, metropolitan (local) communications systems require extensive routing and switching of traffic among various nodes positioned within interconnecting optical fiber rings. Consequently, smaller metropolitan markets require considerably more extensive add-drop multiplexing in order to successfully implement wavelength division multiplexing in their short-range systems. Further, in order to maximize the effectiveness of wavelength division multiplexing in these local areas, it would be useful to implement bidirectional WDM optical systems, e.g., to enhance network design flexibility. In a bidirectional WDM system counter-propagating WDM optical signals, each of which carry a number of optical channels, are carried on the same waveguiding medium, such as a single optical fiber. Implementation of a bidirectional system requires several considerations not present in the conventional unidirectional optical systems. Amplification of a bidirectional system requires specially-designed optical fiber amplifiers or convoluted simultaneous routing of the bidirectional WDM signals in a single direction through a unidirectional amplifier. Various configurations for bidirectional amplifiers are depicted in U.S. Pat. Nos. 5,604,627, 5,633,741, 5,742,416, 5,812,306, 5,887,091, 5,995,259, 6,081,368, and 6,101,016, the disclosures of which are incorporated by reference.

In addition to the increased difficulty in amplifying bidirectional WDM optical signals, add-drop multiplexing in the bidirectional optical environment becomes considerably more complex. Further, because frequent add-drop multiplexing is required in local metropolitan systems, a bidirectional add-drop multiplexer must be cost-effective and robust, i.e., capable of repeated operation with little chance of failure (e.g., due to moving parts such as switches, movable reflectors, etc.). Several bidirectional multiplexing designs have been proposed; however, these designs are predominantly directed to the issue of transmitting to or receiving from the optical transmission fiber at the beginning or end point of an optical system (e.g., the system end nodes). In U.S. Pat. No. 5,909,295, optical circulators are used to separate the counter-propagating optical signals that are further filtered down to individual channel wavelengths. In many embodiments, expensive four-port (or higher) optical circulators must be used. Although optical channels are separated, there is no teaching or suggestion of signal recombination such that a bidirectional optical signal continues to propagate along a bidirectional transmission waveguide.

In U.S. Pat. No. 5,748,350, optical circulators and gratings are again used to separate or combine various optical channels. Although the device itself is "bidirectional" in the sense that wavelengths being reflected by a Bragg grating into a circulator propagate in a direction opposite to signal being transmitted through the Bragg gratings, the optical signals placed onto output fibers create a unidirectional WDM signal propagating in a single direction.

Thus, there is a need in the art for a bidirectional add-drop multiplexer for use in bidirectional optical communication systems. Such a bidirectional multiplexer would permit effective implementation of bidirectional wavelength division multiplexing in local, metropolitan markets requiring high volumes of signal re-routing.

SUMMARY OF THE INVENTION

The present invention provides a bidirectional add-drop multiplexer for bidirectional wavelength division multiplexed optical communication systems. In a first configuration, the bidirectional add-drop multiplexer includes six three-port optical circulators. Each of the optical circulators is configured such that optical signals entering the first optical port exit at the second optical port, while signals entering the second optical port exit at the third optical port. The bidirectional add-drop multiplexer is placed at any point along a bidirectional transmission waveguide configured to carry two counter-propagating wavelength division multiplexed optical signals, nominally represented as a west-east WDM optical signal and an east-west WDM optical signal in accordance with traditional industry nomenclature.

The bidirectional waveguide places the west-east wavelength division multiplexed optical signal into the first port of the first circulator where it exits onto an optical path allowing it to enter the first port of the second optical circulator. As the west-east WDM signal exits the second port of the second circulator, it encounters an optical channel selector for selecting one or more optical channels from the west-east WDM signal to be dropped. The dropped channels are output through the third port of the second circulator while the remaining through channels of the west-east WDM signal enter the first port of the third optical circulator. One or more optical channels to be added are input through the third port of the third optical circulator. As they exit through the first port, they encounter the optical channel selector which routes the add channels back through the first port of the third optical circulator, where they join the through channels of the west-east WDM signal.

Similarly, the other end of the bidirectional transmission waveguide in which the bidirectional add-drop multiplexer has been interposed places the east-west wavelength division multiplexed optical signal into the first port of the fourth optical circulator. As the east-west WDM signal enters the fourth optical circulator, the west-east WDM signal (including the added optical channels) enters the third port of the fourth optical circulator. From there, the west-east WDM signal travels to the bidirectional transmission waveguide through the first port of the fourth circulator as the east-west WDM signal simultaneously enters through the first port.

The east-west WDM signal exits onto an optical path allowing it to enter the first port of the fifth optical circulator. As the east-west WDM signal exits the second port of the fifth circulator, it encounters an optical channel selector for selecting one or more optical channels from the east-west WDM signal to be dropped. The dropped channels are output through the third port of the fifth circulator while the remaining through channels of the east-west WDM signal enter the first port of the sixth optical circulator. One or more optical channels to be added are input through the third port of the sixth optical circulator. As the add channels exit through the first port, they encounter the optical channel selector which routes the add channels back through the first port of the sixth optical circulator, where they join the through channels of the east-west WDM signal.

The east-west optical WDM signal, along with the added east-west channels, enters the third port of the first optical circulator. From there, it is output through the first port of the first optical circulator as the west-east WDM signal simultaneously enters bidirectional add-drop multiplexer through the first port.

Optionally, optical amplifiers can be inserted between the optical circulators at one or more locations in the bidirectional add-drop multiplexer for amplifying both the west-east and east-west WDM optical signals. For bidirectional optical systems in which fiber dispersion is an issue, dispersion compensation means may be applied between optical circulators or at an additional port in each of the entrance circulators.

DETAILED DESCRIPTION

Figure 1:
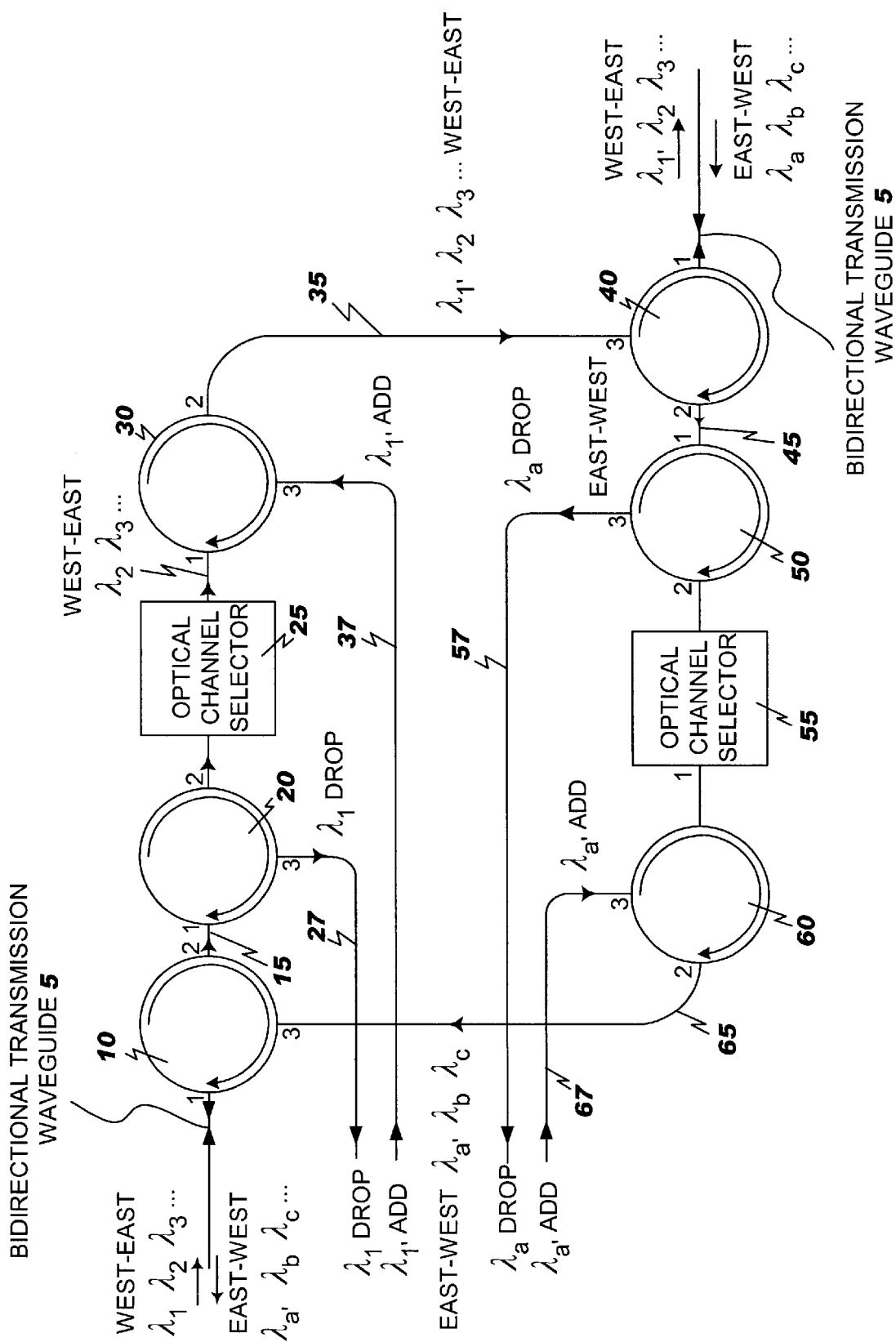
FIG. 1 is a bidirectional add-drop multiplexer for interposing in a single waveguide, bidirectional optical system.

Turning to the drawings in detail in which like numerals indicate the same or similar elements in each of the several views, FIG. 1 depicts a bidirectional optical add-drop multiplexer 100 according to a first embodiment of the present invention. As seen in FIG. 1, the bidirectional add-drop multiplexer 100 is interposed along a bidirectional optical transmission waveguide 5. As discussed in further detail below, bidirectional optical transmission waveguide 5 is configured to carry two counter-propagating wavelength division multiplexed optical communication signals, each WDM signal comprised of plural optical channels at different wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\lambda_3$ etc., while the individual optical channels in the east-west WDM optical signal are denoted by the symbols $\lambda_a$, $\lambda_b$, $\lambda_c$, etc. for clarity of presentation.

The bidirectional optical add-drop multiplexer includes six three-port optical circulators, 10, 20, 30, 40, 50, and 60. In each of these three-port circulators, optical signals entering the first optical port of the circulator are Faraday rotated to exit the second optical port. Similarly, optical signals entering the second optical port exit through the third optical port while signals entering the third optical port exit through the first optical port. The operation of optical circulators is discussed in *Optical Networks: A Practical Perspective*, incorporated by reference above. In the present invention, any device which is capable of transferring optical signals among plural input and output ports may be used for elements 10, 20, 30, 40, 50, and 60 in the bidirectional add-drop multiplexer. Three-port optical circulators such as those depicted in FIG. 1 are commercially available from a variety of sources including E-Tek, JDS Uniphase, AOC Technologies, and Tokin and will not be further described here.

As seen in FIG. 1, the west-east WDM optical signal enters optical port 1 of circulator 10 where it is output to optical path 15. Any medium capable of carrying a WDM optical signal may be used as an optical path; typically an optical fiber or other waveguiding medium is employed. Optical path 15 optically communicates with the first optical port of circulator 20 such that the west-east WDM optical signal enters the first port of the second circulator. As used herein, the expression "optically communicates" designates an optical path between two elements. The optical path may be a direct path or it may route through intermediate optical devices (e.g., optical isolators, additional optical circulators, filters, amplifiers, etc.). Upon entering the first port of circulator 20, the west-east optical signals are transferred to output port 2. Output port 2 of circulator 20 optically communicates with optical channel selector 25. Upon encountering optical selector 25, one or more channels to be dropped from the west-east WDM signal are selected and routed back towards the second optical port of circulator 20. The remaining optical channels of the west-east WDM signal, i.e., the "through" channels $\lambda_2$, $\lambda_3$ . . . , are routed towards first optical port of circulator 30. In the example depicted in FIG. 1, channel $\lambda_1$ is selected by channel selector 25 and routed back through optical port 2 where it is "dropped" at optical port 3 of circulator 20 onto optical path 27. From there, the selected optical channel may be routed directly to a receiver or it may be directed to another bidirectional (or unidirectional) optical system (e.g., an optical ring network serving a different geographical region). In this manner, individual optical channels may be leased/contracted to individual customers for exclusive use by that customer.

As the through optical channels are routed towards circulator 30, they enter the first optical port and exit through the second optical port onto output path 35. If it is desired to add one or more optical channels to the west-east WDM optical signal, the "add" channels are input via optical path 37 to the third optical circulator. The added channels are output through optical port 1 of circulator 30 where they are re-routed by optical channel selector 25 back through port 1 of circulator 30, exiting through port 2 onto optical path 35 along with "through" optical channels of the west-east WDM optical signal. The add channels may be produced by a local optical transmitter or they may be channels that have been routed to the bidirectional add-drop multiplexer from another optical system or from another segment of the same bidirectional optical system.

As recognized by those of ordinary skill in the optical communication systems art, optical circulator 30 can be easily replaced by a standard optical coupler, in which case the added optical channels would not interact with optical channel selector 25 but would be directly added to the through optical channels.

Optical channel selector 25 may be selected from any static or reconfigurable optical device which is capable of separating or otherwise routing one or more optical wavelengths from a wavelength division multiplexed optical signal. Such devices include, but are not limited to, Bragg gratings, tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, as well as in many of the patents, incorporated by reference above.

In an exemplary embodiment, optical channel selector 25 comprises a chirped Bragg grating, i.e., a grating having a distribution of refractive index perturbations whose period varies along the axis of propagation. When a chirped grating is used in channel selector 25, the dropped optical channel is given a positive or negative chirp in the process of being diffracted by the grating, while the added optical channel is given a complementary negative or positive chirp, respectively, in the process of being diffracted by the same grating in the opposite direction. A positive chirp may be introduced in the added channel to reduce nonlinear interactions as the optical channel is transported along the bidirectional optical waveguide 5. This chirp is removed when the optical channel is diffracted by a chirped grating in the next drop operation; this "pre-chirp"/"de-chirp" procedure does not affect the detected signal nor interfere with any dispersion compensation techniques that may be employed in the bidirectional add-drop multiplexer or in other parts of the bidirectional WDM optical system.

Note that channel selector 25 need not be symmetrical, i.e., it need not drop the same number of channels or the same channel wavelengths. For example, the channel selector may comprise two or more tunable Bragg gratings optionally separated by an isolator. Each of the tunable gratings may be tuned to the same or different wavelength, corresponding to the channels to be dropped and added. As long as neither tunable grating is tuned to a wavelength of one of the through channels, such an asymmetrical channel selector may be easily created allowing for dynamically reconfigurable channel selection.

As the west-east through channels and the added channels exit the third circulator onto optical path 35, they are directed towards the third optical port of the fourth optical circulator, circulator 40. As seen in FIG. 1, optical port 1 of circulator 40 forms one of the two ports directly communicating with bidirectional optical transmission waveguide 5 in which the bidirectional add-drop multiplexer has been interposed (with port 1 of first circulator 10 being the other directly-communicating port). The west-east WDM optical signal, now including the added channels, continues in the same direction of propagation along bidirectional transmission waveguide as it is output through the first port of circulator 40.

As the west-east WDM signal exits the bidirectional add-drop multiplexer 100 through circulator 40 port 1, the east-west WDM optical signal simultaneously enters the bidirectional multiplexer 100 through the same port. The east-west WDM optical signal is output onto optical path 45, positioned between optical circulators 40 and 50. The east-west WDM signal enters the first port of circulator 50 where it exits port 2 towards optical channel selector 55. Optical channel selector 55 is substantially similar to selector 25 in that it may be comprised of the optical elements set forth above. Of course, optical channel selector 55 is configured to interact with the wavelengths of the east-west WDM signal, rather that the west-east wavelengths of channel selector 25.

As with the west-east WDM optical signal, upon encountering optical selector 55, one or more channels to be dropped from the east-west WDM signal are selected and routed back towards the second optical port of circulator 50. The remaining optical channels of the east-west WDM signal, i.e., the "through" channels $\lambda_b$, $\lambda_c$ . . . , are routed towards first optical port of circulator 60. In the example depicted in FIG. 1, channel $\lambda_a$ is selected by channel selector 55 and routed back through optical port 2 where it is "dropped" at optical port 3 of circulator 50 onto optical path 57.

As the through optical channels are routed towards circulator 60, they enter the first optical port and exit through the second optical port onto output path 65. If it is desired to add one or more optical channels to the east-west WDM optical signal, the "add" channels are input via optical path 67 to the sixth optical circulator 60. The added channels are output through optical port 1 of circulator 60 where they are re-routed by optical channel selector 55 back through port 1 of circulator 60, exiting through port 2 onto optical path 65 along with "through" optical channels of the east-west WDM optical signal. As with the west-east channels added and dropped, the added or dropped east-west channels may originate or terminate at local or remote locations.

Completing the optical path towards the bidirectional optical transmission waveguide 5, the east-west optical WDM signal, along with the added optical channels, are input to the third optical port of the first optical circulator 10, where they rejoin bidirectional waveguide 5. The east-west WDM optical signal is continually output to bidirectional optical transmission waveguide 5 through port 1 of the first circulator as the west-east WDM optical signal is continually input to the bidirectional add-drop multiplexer through port 1 of the first circulator.

Figure 2:
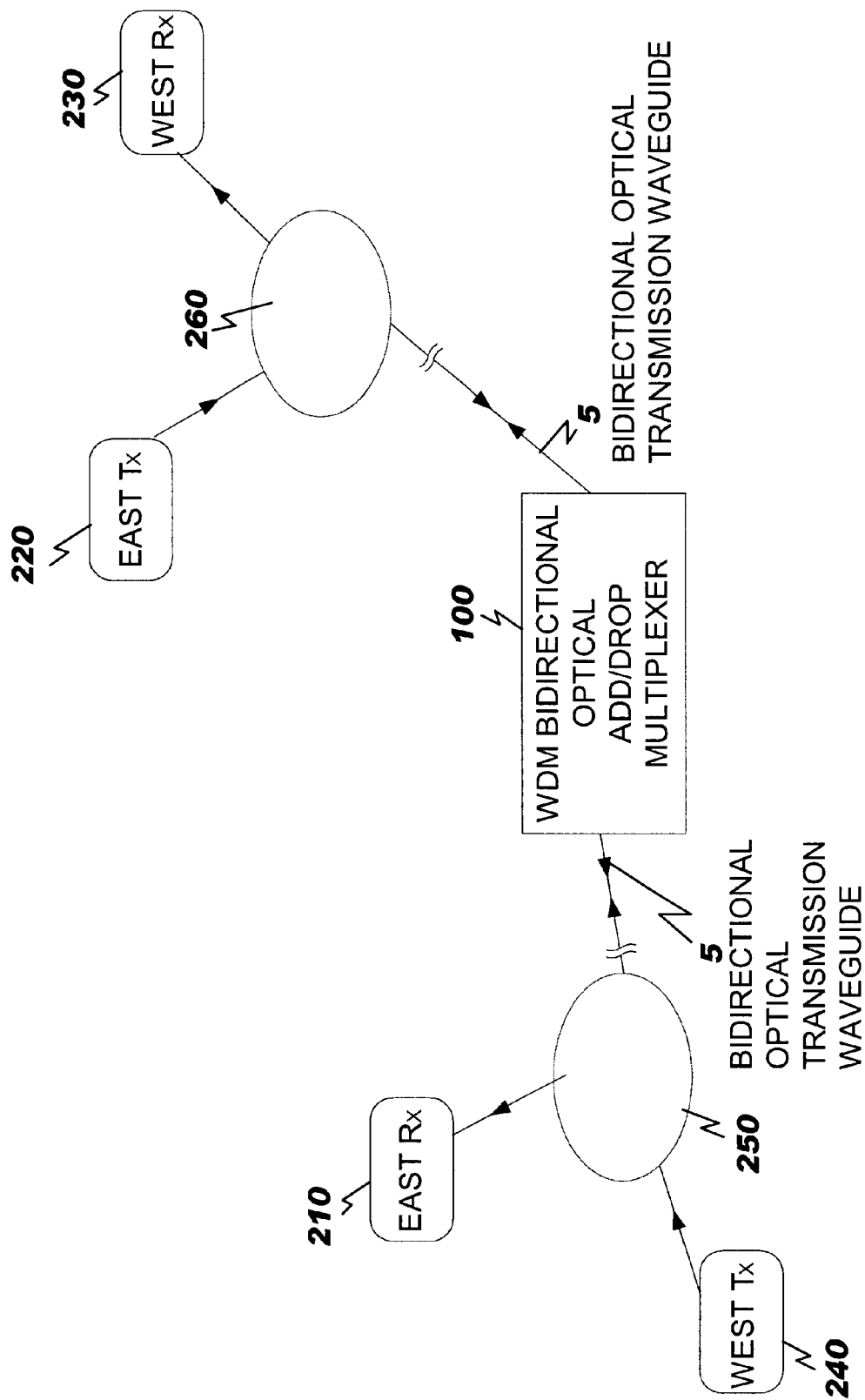
FIG. 2 is a schematic representation of a bidirectional optical communication system including the bidirectional add-drop multiplexer of FIG. 1.

FIG. 2 schematically depicts the deployment of bidirectional optical add-drop multiplexer 100 in a bidirectional wavelength division multiplexed optical system. Unlike long-haul transmission systems, regional and metropolitan area optical networks typically do not include a single transmitter and receiver location. Instead, as optically channels are continually routed through the use of optical add-drop multiplexers such as those depicted in FIG. 1, transmitters and/or receivers are located at various points along a bidirectional optical transmission path, such as an optical ring or a subtended optical ring.

As seen in FIG. 2, the bidirectional optical add-drop multiplexer 100 is interposed along a portion of bidirectional optical transmission waveguide 5. Because bidirectional optical transmission waveguide 5 must support two counter-propagating WDM optical communication signals, it must optically communicate with both a plurality of optical transmitters and a plurality of optical receivers at both ends of the waveguide (or at various add-drop nodes along the bidirectional waveguide). This is a considerable difference from conventional unidirectional systems in which an optical fiber merely has to be connected to one or more transmitters at one end and one or more receivers at the other end. In FIG. 2, only one east-west transmitter receiver pair (220 and 210, respectively) is shown for clarity; similarly, one west-east transmitter receiver pair (240 and 230, respectively) is depicted. As seen schematically displayed by the various locations of the transmitters and receivers, these elements are typically not co-located as in the end nodes of a conventional long-haul system. Instead, such transmitters and receivers are more likely associated with other add-drop multiplexers positioned at various nodes in the local, metropolitan system. In this manner, there is a continual adding and dropping of individual channels such that each channel of a given east-west or west-east counter-propagating WDM signal may have originated at different locations throughout the system. This idea is rendered conceptually in FIG. 2 by optical spaces 250 and 260 which may include additional bidirectional add-drop multiplexers, couplers and or circulators for combining the bidirectional traffic from the various transmitter locations onto bidirectional optical transmission waveguide 5 and routing traffic from bidirectional optical transmission waveguide 5.

Figure 3:
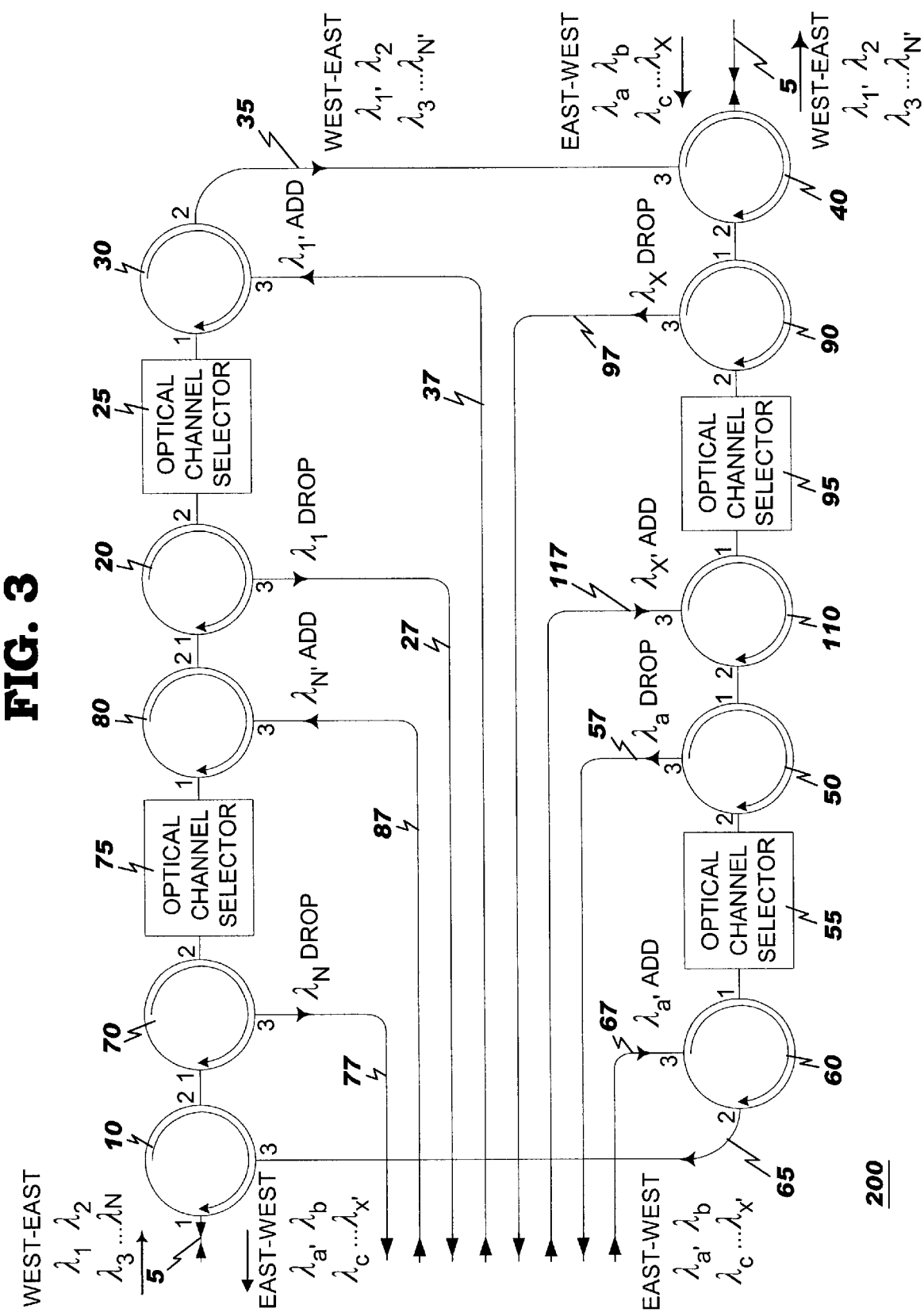
FIG. 3 is a bidirectional add-drop multiplexer according to a further embodiment of the present invention including additional channel selectors.
Figure 4:
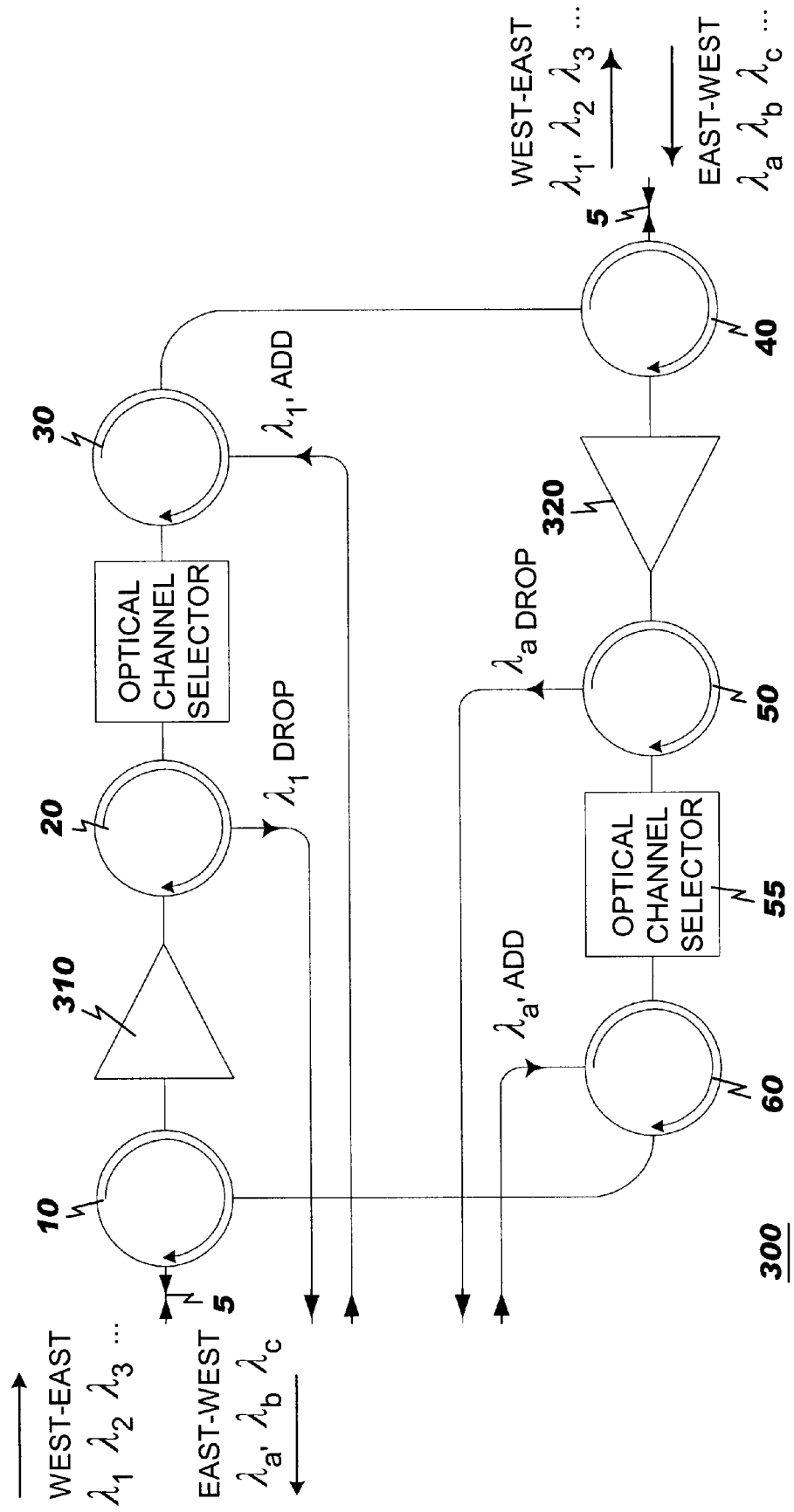
FIG. 4 is a bidirectional add-drop multiplexer according to a further embodiment of the present invention including amplification.

Because of the heavy demand for routing of local traffic, the bidirectional optical add-drop multiplexers of the present invention may optionally incorporate further channel selectors, as shown in the configuration of FIG. 3. In bidirectional optical add-drop multiplexer 200, an additional channel selector 75, along with optical circulators 70 and 80, is interposed between optical circulators 10 and 20 such that additional optical channels (designated here as $\lambda_N$) may be add-dropped along optical paths 77 and 87 in the same manner as described above. Similarly, an additional channel selector 95 with accompanying circulators 90 and 110 may be used for add-dropping optical channels (designated here as $\lambda_x$) along optical paths 97 and 117. Advantageously, plural circulator/channel selector systems may be added as needed to bidirectional add-drop multiplexer 200. By separating the add/dropping of a single optical channel at a time with multiple circulator/channel selector sub-systems, the traffic may be more readily routed to diverse locations (e.g., different SONET rings, interexchange vs. local destinations, unidirectional local networks on customer premises, etc.). Because bidirectional optical transmission line 5 must be interrupted at many locations in a local network to interpose the bidirectional add-drop multiplexers, it may be advantageous to include optical amplification in the add-drop multiplexer to minimize the need to further insert optical amplifiers at other locations along the bidirectional transmission line. FIG. 4 depicts a bidirectional optical add-drop multiplexer 300 according to a further embodiment of the present invention further including optical amplifiers 310 and 320 positioned within each directional portion of the bidirectional optical add-drop multiplexer. Because the bidirectional WDM optical signal has been separated into west-east and east-west WDM signals in these portions of the bidirectional add-drop multiplexer, optical amplifiers configured to amplify optical traffic propagating in a single direction may be employed.

It is noted that although optical amplifier 310 is shown positioned between circulators 10 and 20 and optical amplifier 320 is shown positioned between circulators 40 and 50, the placement of the optical amplifiers within the bidirectional add-drop multiplexer is selected based upon the overall optical network topology, taking into account the various signal strengths of the channels comprising each bidirectional WDM signal and the signal strengths of the various optical channels to be dropped or added from the bidirectional WDM signals. Further, as appreciated by those of ordinary skill in the art, additional optical amplifiers may be interposed within the bidirectional add-drop multiplexer as well as along the optical paths routing the one or more optical channels to be added or dropped from the bidirectional WDM signals. In general, it is desired that all of the optical channels comprising a bidirectional WDM optical signal have approximately equivalent signal strengths; this consideration will drive the placement decision for the optical amplifier in any particular bidirectional add-drop multiplexer. In addition, if gain compensation techniques are employed in either the bidirectional add-drop multiplexer or in any of the optical transmitters (e.g., for controlling the launch power in the added optical channels) or in any of the "drop" optical paths, the placement of any optical amplifier in the bidirectional add-drop multiplexer will be affected; i.e., the use of gain compensation/equalization would be a factor in amplifier location.

As appreciated by those of ordinary skill in the art, optical amplifiers 310 and 320 may be selected from any device capable of optically amplifying an optical signal without the need for conversion to an electrical signal. Such devices include, but are not limited to, doped fiber amplifiers (e.g., erbium-doped fiber amplifiers), semiconductor optical amplifiers, Raman optical amplifiers, etc. Particulars of various optical amplifiers may be found in Chapter 3 of *Optical Networks: A Practical Perspective*, incorporated by reference above.

Depending upon the selected channel plan for the overall optical network, optical amplifiers 310 and 320 may be customized for optimal gain flatness in the wavelength region of the selected channels. For example, if the west-east WDM signal includes only optical channels within the C-band (nominally defined as wavelengths from approximately 1530–1565 nm), then amplifier 310 would be optimized to provide as flat a gain profile as possible across those wavelengths. Conversely, if the east-west WDM signal includes only optical channels within the L band (nominally defined as wavelengths from approximately 1565–1610 nm), then amplifier 320 would be optimized to provide an adequately flat gain profile across those wavelengths.

Alternatively, the west-east channels may be selected from wavelengths across the entire wavelength spectrum to provide maximum interchannel spacing distance (and minimize potential cross talk. In such an embodiment, the east-west channel wavelengths would alternate with the west-east channel wavelengths in an interleaved manner (e.g., west-east channel wavelengths of 1528, 1532, 1536, 1540, etc. and east-west channel wavelengths of 1530, 1534, 1538, 1542, etc.). In this channel plan, amplifiers with reasonably flat gain profiles, such as semiconductor optical amplifiers, may be selected. In either case, the west-east and east-west channels plans will likely be dictated by overall system considerations, such as the network topology in which the bidirectional optical add drop multiplexer will be deployed. Further, because the west-east and east-west WDM optical signals are routed along different paths within the add-drop multiplexers, it is possible that one or more of the optical channel wavelengths in each of the counter-propagating WDM signals may be the same.

Various dispersion compensation techniques may also be employed in the bidirectional add-drop multiplexers of the present invention. For example, an additional circulator port may be positioned between the first and second ports of circulators 10 and 40. An output path including a chirped grating may be placed in communication with this added port such the all of the west-east or east-west channels are reflected back through the added port. As they are reflected back by the chirped grating, a chirp is applied to compensate for transmission-induced signal dispersion. Alternatively, an additional three-port circulator having a second port with a chirped grating in its output path may be positioned between circulators 10 and 20 or between circulators 40 and 50 to accomplish the same dispersion-compensating effect.

Other add-drop techniques may be employed on the directional paths between the first and fourth circulators. For example, a four-port circulator could replace circulators 20 and 30 when desiring to drop all the channels of the west-east WDM optical signal (and replace them with new channels). Similarly, a four-port circulator could replace circulators 50 and 60 when dropping all east-west channels followed by the addition of new channels.

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A bidirectional wavelength division multiplexed optical communication system having a bidirectional add-drop multiplexer interposed along a bidirectional optical waveguide, the bidirectional add-drop multiplexer comprising:

a first optical circulator having at least first, second and third optical ports configured such that optical signals entering the first optical port exit through the second optical port and optical signals entering the second optical port exit through the third optical port;

a first optical waveguide configured to carry a bidirectional wavelength division multiplexed optical communication signal, the bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction, the first optical waveguide optically communicating with the first optical port of the first optical circulator;

a second optical waveguide having first and second ends, the first end of the second optical waveguide optically communicating with the second port of the first optical circulator, the second optical waveguide configured to receive the first wavelength division multiplexed signal propagating in the first direction from the first optical port of the first optical circulator;

a second optical circulator having at least first, second and third optical ports configured such that optical signals entering the first optical port exit through the second optical port and optical signals entering the second optical port exit through the third optical port, the second end of the second waveguide optically communicating with the first port of the second optical circulator;

a first optical channel selector for selecting one or more first optical channels from a wavelength division multiplexed optical communication signal optically communicating with the second optical port of the second optical circulator, the first optical channel selector configured to route the selected one or more first optical channels back towards the second optical port of the second optical circulator such that the selected one or more optical channels are dropped from the first wavelength division multiplexed optical communication signal and exit through the third port of the second optical circulator while remaining first channels of the first wavelength division multiplexed optical communication signal pass through the first optical channel selector;

a third optical circulator having at least first, second and third optical ports configured such that optical signals entering the first optical port exit through the second optical port and optical signals entering the second optical port exit through the third optical port, the first optical port of the third optical circulator optically communicating with the first optical channel selector for receiving the remaining first channels of the first wavelength division multiplexed optical communication signal;

a third optical waveguide optically communicating with the third port of the third optical circulator, the third optical waveguide optically communicating with a source of one or more first optical channels to be added to the first wavelength division multiplexed optical communication signal propagating in the first direction and configured such that the first optical channels to be added enter the third port of the third optical circulator and are output through the first port of the third optical circulator such that the first one or more optical channels to be added optically interact with the first optical channel selector and are routed back through the first port of the third optical circulator and exit through the second port of the third optical circulator along with remaining first channels from the first wavelength division multiplexed optical communication signal;

a fourth optical circulator having at least first, second and third optical ports configured such that optical signals entering the first optical port exit through the second optical port and optical signals entering the third optical port exit through the first optical port, the third port of the fourth optical circulator configured to receive the remaining first channels of the first wavelength division multiplexed optical communication signal and the first set of one or more added channels from the second port of the third optical circulator such that the first wavelength division multiplexed optical communication signal exits through the first port of the fourth optical circulator;

a fourth optical waveguide configured to carry the bidirectional wavelength division multiplexed optical communication signal optically communicating with the first optical port of the fourth optical circulator for receiving the first wavelength division multiplexed optical communication signal propagating in the first direction from the first port of the fourth optical circulator and for supplying the second wavelength division multiplexed optical communication signal propagating in the second direction to the first port of the fourth optical circulator;

a fifth optical waveguide having first and second ends, the first end of the fifth optical waveguide optically communicating with the second port of the fourth optical circulator, the fifth optical waveguide configured to receive the second wavelength division multiplexed signal propagating in the second direction from the first port of the fourth optical circulator;

a fifth optical circulator having at least first, second and third optical ports configured such that optical signals entering the first optical port exit through the second optical port and optical signals entering the second optical port exit through the third optical port, the second end of the fifth waveguide optically communicating with the first port of the fifth optical circulator;

a second optical channel selector for selecting one or more second optical channels from the second wavelength division multiplexed optical communication signal, the second optical channel selector optically communicating with the second optical port of the fifth optical circulator, the second optical channel selector configured to route the selected one or more second optical channels back towards the second optical port of the fifth optical circulator such that the selected one or more optical channels are dropped from the second wavelength division multiplexed optical communication signal and exit through the third port of the fifth optical circulator while remaining second channels of the second wavelength division multiplexed optical communication signal pass through the second optical channel selector;

a sixth optical circulator having at least first, second and third optical ports configured such that optical signals entering the first optical port exit through the second optical port and optical signals entering the third optical port exit through the first optical port, the first optical port of the sixth optical circulator optically communicating with the second optical channel selector;

a sixth optical waveguide optically communicating with the third port of the sixth optical circulator, the sixth optical waveguide optically communicating with a source of one or more second optical channels to be added to the second wavelength division multiplexed optical communication signal propagating in the second direction and configured such that the second optical channels to be added enter the third port of the sixth optical circulator and are output through the first port of the sixth optical circulator such that the second one or more optical channels to be added optically interact with the second optical channel selector and are routed back through the first port of the sixth optical circulator and exit through the second port of the sixth optical circulator along with remaining second channels from the second wavelength division multiplexed optical communication signal;

a seventh optical waveguide optically communicating with the second port of the sixth optical circulator and the third port of the first optical circulator configured such that the second wavelength division multiplexed optical signal and the second one or more added channels exiting through the second optical port of the sixth optical circulator are routed to the third optical port of the first optical circulator and output through the first optical port of the first optical circulator onto the first optical waveguide.

2. The bidirectional wavelength division multiplexed optical communication system having a bidirectional add-drop multiplexer as set forth in claim 1, the bidirectional add-drop multiplexer further comprising a first optical amplifier positioned between the first and second optical circulators.

3. The bidirectional wavelength division multiplexed optical communication system having a bidirectional add-drop multiplexer as set forth in claim 2 the bidirectional add-drop multiplexer further comprising a second optical amplifier positioned between the fourth and fifth optical circulators.

4. The bidirectional wavelength division multiplexed optical communication system having a bidirectional add-drop multiplexer as set forth in claim 1 further comprising an additional pair of three-port optical circulators having a further optical channel selector positioned therebetween positioned between the first and second optical circulators.

5. The bidirectional wavelength division multiplexed optical communication system having a bidirectional add-drop multiplexer as set forth in claim 1 further comprising an additional pair of three-port optical circulators having a further optical channel selector positioned therebetween positioned between the fourth and fifth optical circulators.

6. The bidirectional wavelength division multiplexed optical communication system having a bidirectional add-drop multiplexer as set forth in claim 1 in which at least one of the first and second optical channel selectors includes one or more chirped Bragg gratings.

* * * * *